US006992787B2

(12) United States Patent
Fredlund et al.

(10) Patent No.: US 6,992,787 B2
(45) Date of Patent: *Jan. 31, 2006

(54) METHOD OF PURCHASING IMAGE BEARING PRODUCTS

(75) Inventors: John R. Fredlund, Rochester, NY (US); Joseph A. Manico, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 880 days.

This patent is subject to a terminal disclaimer.

(21) Appl. No.: 09/859,033

(22) Filed: May 16, 2001

(65) Prior Publication Data

US 2002/0181009 A1 Dec. 5, 2002

(51) Int. Cl.
*G06F 15/00* (2006.01)
*B41J 1/00* (2006.01)

(52) U.S. Cl. .................................................... 358/1.15

(58) Field of Classification Search ................. 358/1.9, 358/487, 1.15, 403; 396/2
See application file for complete search history.

(56) References Cited

U.S. PATENT DOCUMENTS

| | | | | | |
|---|---|---|---|---|---|
| 5,587,740 | A | * | 12/1996 | Brennan | 348/373 |
| 5,666,215 | A | | 9/1997 | Fredlund et al. | |
| 6,646,754 | B1 | * | 11/2003 | Redd et al. | 358/1.13 |
| 2002/0116278 | A1 | * | 8/2002 | Mayer et al. | 705/26 |

* cited by examiner

*Primary Examiner*—Kimberly Williams
*Assistant Examiner*—Charlotte M. Baker
(74) *Attorney, Agent, or Firm*—Susan L. Parulski; David A. Novais

(57) ABSTRACT

A method of purchasing image bearing products, including the steps of providing a plurality of network connected kiosks having image input and product output capability; generating an identifier; inputting an image at one of the plurality of network connected kiosks; storing the image at a network accessible location; notifying a recipient of the identifier after providing payment for the image bearing product; and using the identifier to retrieve the image from any one of the plurality of network connected kiosks.

43 Claims, 13 Drawing Sheets

METHOD OF PURCHASING IMAGE BEARING PRODUCTS

CROSS REFERENCE TO RELATED APPLICATION

Reference is made to commonly assigned application U.S. Ser. No. 09/858,360, entitled "METHOD OF DISPENSING IMAGE BEARING PRODUCTS," and filed on common date herewith in the names of J. A. Manico and J. R. Fredlund, and which is assigned to the assignee of this application.

FIELD OF THE INVENTION

The invention relates to image producing kiosks. More particularly, the invention relates to purchasing image bearing products from image producing kiosks.

BACKGROUND OF THE INVENTION

Various types of image producing kiosks are well known, and have been referred to by various names, for example, photo kiosks or photo booths. These image producing kiosks are typically located in a public area so as to be readily accessible to the user (e.g., the passerby, consumer) to provide the user with an opportunity to interact with the kiosk to form/produce an image. For convenience of discussion, the term "kiosk" will hereinafter be used to refer to the various types of image producing kiosks. The image product formed/produced by the kiosk (e.g., the image bearing product) for the user could be in the form of a print or enlargement. The kiosk might include an enclosed area in which to pose for an image, a partially enclosed area, a partially open area, or be fully open for posing. An example of a commercially available kiosk is the Kodak Picture Maker™ available from Eastman Kodak Company. Features of this kiosk include scanning of prints and the creation of reprints and enlargements from the scanned print. Optional input devices for this kiosk include a digital film scanner, a camera memory card reader, a CD reader/writer, and a tethered digital camera. Further features of this kiosk include the ability to add borders and manipulate the image to increase the personal value and enjoyment of the image.

Computer systems which are networked allow for the sending and receiving of files to/from a remote location. Kiosks can be similarly networked, whereby images may be sent to and received from a remote location. While kiosks can be networked, the user of the kiosk may wish to provide the image bearing product produced by the kiosk as a gift/memento/keepsake for another person (hereinafter, the recipient) located remotely from the kiosk. If the image bearing product is being provided as a gift, the user will desire to pay for the product, and as such, the payment is provided remotely from the receipt of the gift. For example, the user located in California may wish to provide an image to a business associate (the recipient) located in New York. Thus, there exists a need to be able to collect payment from the user at a first location, to provide the image bearing product produced using the kiosk by the user to a recipient located at a remote location, and to ensure that the image bearing product is provided only to the intended recipient. Accordingly, a need continues to exist for a method by which networking can be used to provide image bearing products and by which a remote purchase can be made.

SUMMARY OF THE INVENTION

An object of the present invention is to provide a method for dispensing an image bearing product and collecting payment for the image bearing product.

Another object of the invention is to provide a method for dispensing an image bearing product to a recipient located remotely from where the payment of the image bearing product occurred.

These objects are given only by way of illustrative example. Thus, other desirable objectives and advantages inherently achieved by the disclosed invention may occur or become apparent to those skilled in the art. The invention is defined by the appended claims.

According to one aspect of the present invention, there is provided a method of purchasing image bearing products, including the steps of providing a plurality of network connected kiosks having image input and product output capability; generating an identifier; inputting an image at one of the plurality of network connected kiosks; storing the image at a network accessible location; notifying a recipient of the identifier after providing payment for the image bearing product; and using identifier to retrieve the image from any one of the plurality of network connected kiosks.

According to another aspect of the present invention, there is provided a method of notifying a recipient of the availability of an image bearing product. The method comprises the steps of providing a plurality of network connected kiosks having image input capability, product output capability, and point of sale capability; generating an identifier; inputting an image at one of the plurality of network connected kiosks; storing the image at a network accessible location; providing payment for the image bearing product using the point of sale capability; notifying a recipient of the identifier after payment has been provided; using the identifier to retrieve the image from any one of the plurality of network connected kiosks; and using the retrieved image to generate the image bearing product from any one of the plurality of network connected kiosks.

According to yet another aspect of the present invention, there is provided a method of remotely providing an image bearing product. The method comprises the steps of providing a plurality of network connected kiosks having image input and product output capability; generating an identifier; inputting an image at one of the plurality of network connected kiosks; storing the image at a network accessible location; inputting a credit card number and a name of the credit card holder; indicating a dollar limit amount for the charges which can be made to the credit card; notifying a recipient of the identifier; using the identifier to retrieve the image from any one of the plurality of network connected kiosks; displaying, on any one of the plurality of network connected kiosks, purchase options; selecting at least one of the purchase options as the image bearing product; generating the selected purchase option from any one of the plurality of network connected kiosks; charging the credit card for the selected purchase option, and notifying the credit card holder of the amount charged to the credit card.

The present invention provides a method for dispensing an image bearing product, and more particularly, a method for purchasing an image bearing product and providing it to a recipient located remotely.

BRIEF DESCRIPTION OF THE DRAWINGS

The foregoing and other objects, features, and advantages of the invention will be apparent from the following more particular description of the preferred embodiments of the invention, as illustrated in the accompanying drawings.

DETAILED DESCRIPTION OF THE INVENTION

Figure 1:
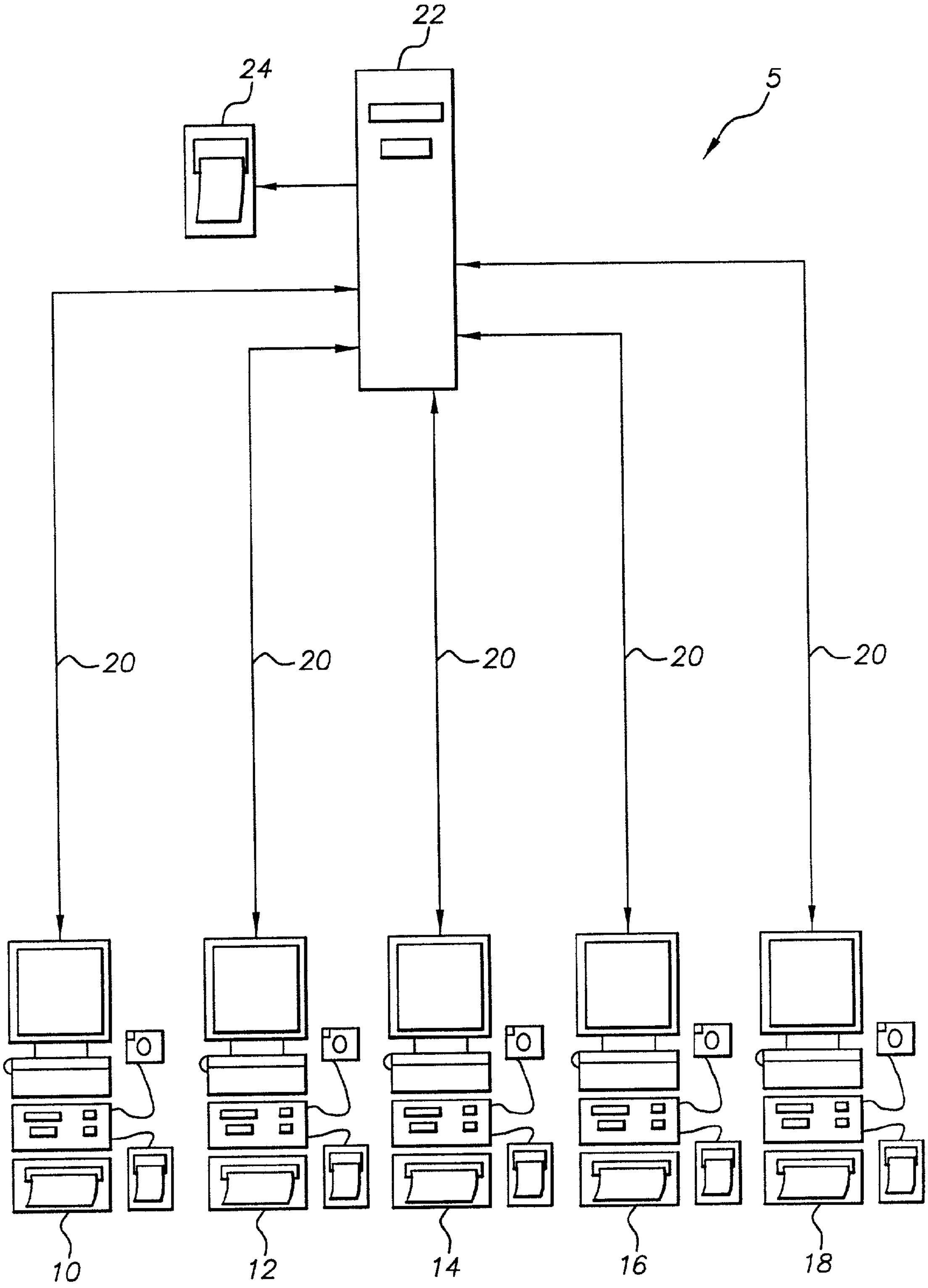
FIG. 1 shows a schematic diagram illustrating a system in accordance with the present invention for dispensing image bearing products.

The following is a detailed description of the preferred embodiments of the invention, reference being made to the drawings in which the same reference numerals identify the same elements of structure in each of the several figures.

FIG. 1 depicts a system 5 in accordance with the present invention. As illustrated, system 5 includes a plurality of image producing kiosks 10, 12, 14, 16, and 18. Each kiosk 10, 12, 14, 16, and 18 is connected by a channel 20 to at least one server 22. Accordingly, kiosks 10, 12, 14, 16, and 18 are network connected to each other by means of server 22. A printer 24 is connected to server 22. Printer 24, in accordance with the present invention, can be silver halide printers, thermal printers, ink jet printers, electrophotographic printers, and the like.

Figure 2:
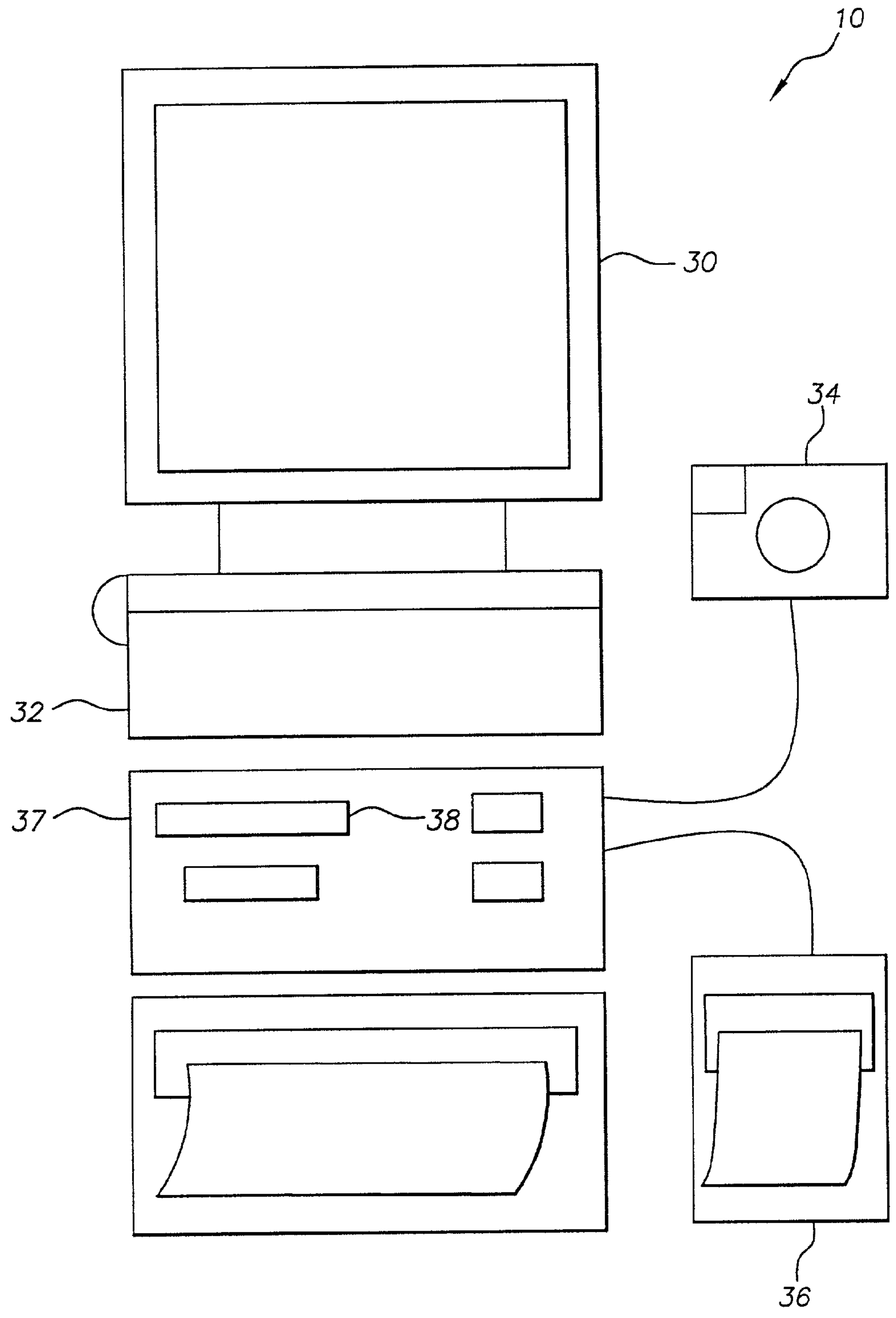
FIG. 2 shows a schematic diagram of an image producing kiosk.

One of kiosks 10, 12, 14, 16, and 18 is more particularly illustrated in FIG. 2, and for ease of discussion, is referenced as kiosk 10. As illustrated in FIG. 2, kiosk 10 includes input means 30 for communicating with the user. Preferably, input means 30 is a screen or monitor having a touch screen interface, though alternatively, a keyboard or other input device may be used to share information with the user. Kiosk 10 further includes a scanner 32 or other device for capturing images and converting the image for storage in digital form, such as on a floppy disk or memory card. An image capture device 34 may be a component of kiosk 10, and may include such known devices as photographic film cameras, digital cameras, and camcorders. Kiosk 10 may include a printer 36 and an input device 37, such as a computer, having an aperture 38 for receiving a digital storage device, such as a floppy disk, memory card, or CD. Printer 36, in accordance with the present invention, can be a silver halide printer, thermal printer, ink jet printer, electrophotographic printer, and the like.

Figure 3:
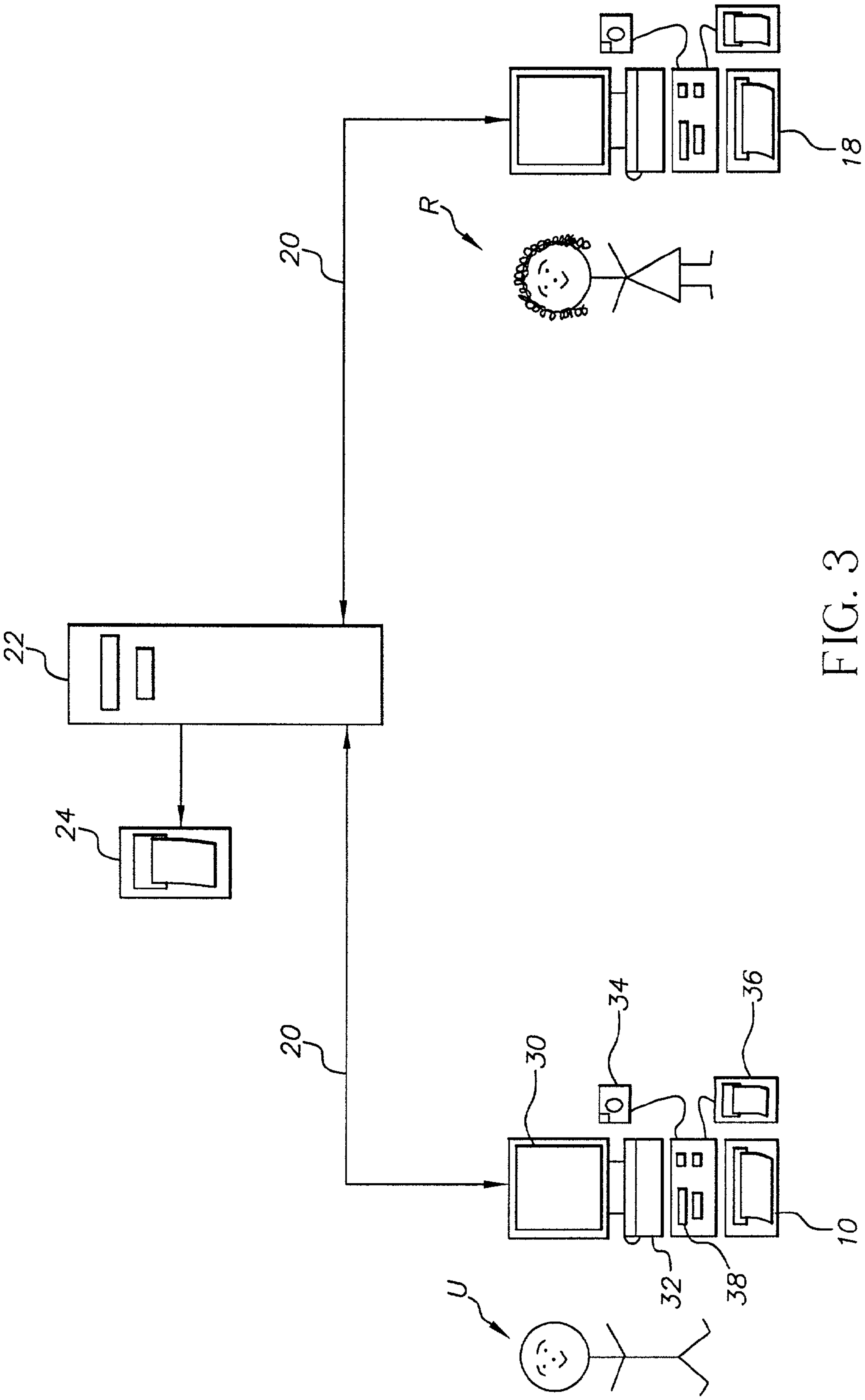
FIG. 3 shows a schematic diagram of a method for dispensing image bearing products in accordance with the present invention.
Figure 4:
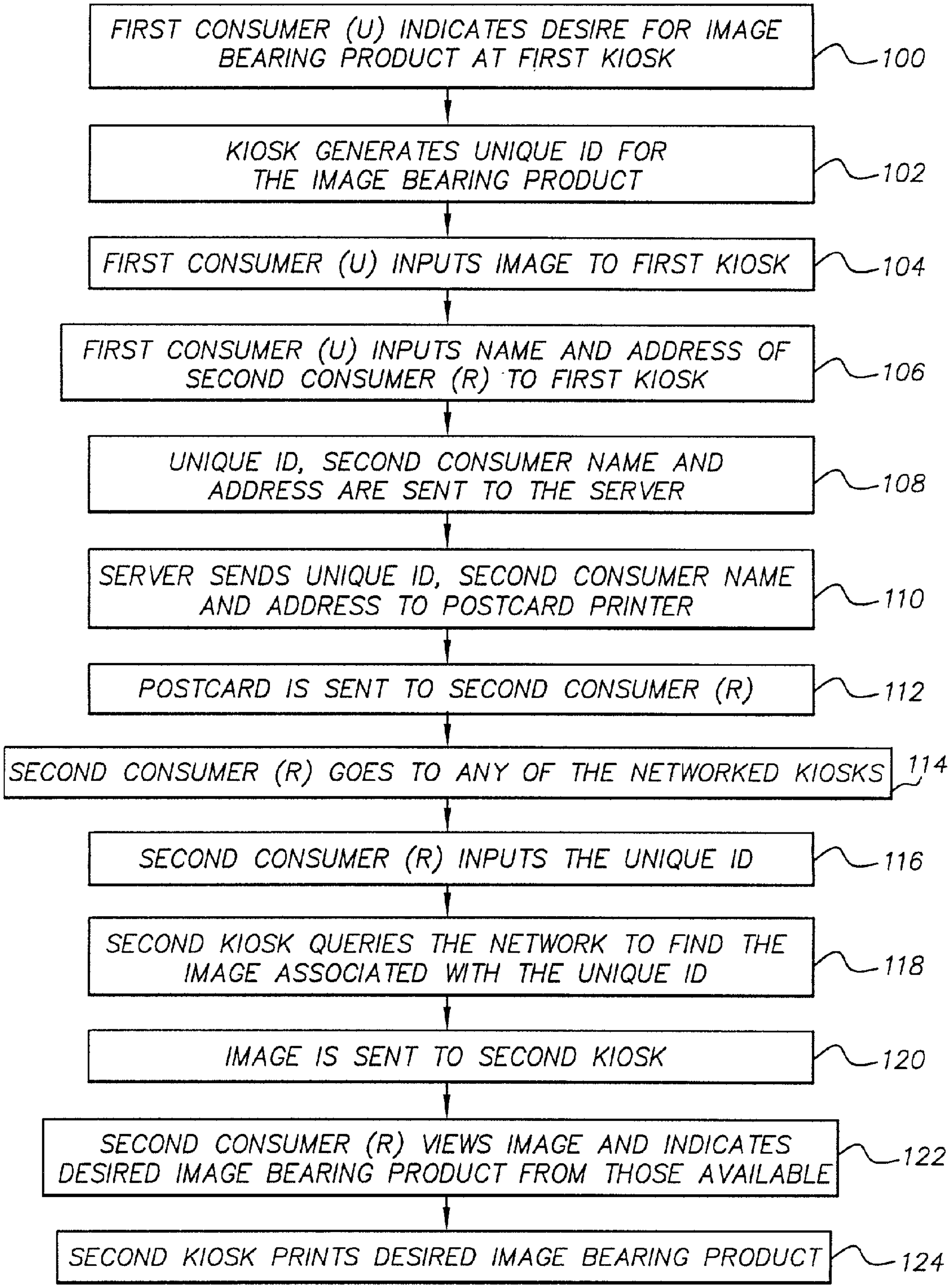
FIG. 4 shows a flow diagram of a method for dispensing image bearing products in accordance with the present invention.

Referring now to FIGS. 3–4, FIG. 3 shows a schematic diagram illustrating a method of dispensing image bearing products in accordance with the present invention, while FIG. 4 depicts a flow diagram of the method.

Imagine for example, that a person, located in California, wishes to send his cousin, located in New York, an 8×10 photograph of their grandmother on her $80^{th}$ birthday. Thus, the person located in California (i.e., a user U or first consumer) can use a kiosk to send an image bearing product (i.e., the 8×10 photograph) to a recipient R (i.e., the cousin; a second consumer) located remotely (i.e., in New York).

First, user U locates a first kiosk. For example user U locates kiosk 10 as illustrated in FIG. 3. Upon locating kiosk 10, user U needs to indicate the desire for an image bearing product to be produced remotely (step 100). This desire is indicated to kiosk 10 by means of input means 30. An identifier ID representative of, associated with, or identified by the transaction is generated by kiosk 10 (step 102). Identifier ID can be textual, alphanumeric, iconic, or can comprise words, sentences or phrases. Preferably, identifier ID is unique. User U then inputs an image I to kiosk 10 (step 104). Image I can be received by kiosk 10 by several means, for example, using scanner 32, image capture device 34, or if the image is in electronic form, using aperture 38. In step 106, user U inputs name and address information of recipient R. The name and address of user U may optionally be input to kiosk 10. Kiosk 10 then sends identifier ID and the recipient's name and address information to server 22 (step 108). Server 22 sends this information to printer 24 for printing (step 110), with the print containing notification of user's U desire to create an image bearing product, the identifier ID, and the name and address of recipient R. The print from printer 24 may be on any printable media and be of various shapes and sizes, including paper, stickers, stock card, and postcards. For illustrative purposes only, Applicants have selected a postcard in which to describe the present invention. A postcard printed from printer 24 is more particularly described below.

Still referring to FIG. 3, the postcard is sent to recipient R (step 112). In step 114 recipient R takes identifier ID to any of the network connected kiosks, which for illustrative purposes is represented in FIG. 3 as kiosk 18. Recipient R inputs identifier ID to kiosk 18 (step 116) by means of input means 30, or by scanning the postcard on scanner 32, or by any other means that allows kiosk 18 to recognize identifier ID, for example, a bar code reader. Upon receiving identifier ID, kiosk 18 queries the network (step 1118), represented by server 22, for the location of image I that has been input by user U. Image I may reside on kiosk 10, kiosk 12, kiosk 14, kiosk 16, or at some other point on the network such as server 22. Image I may be stored at any network accessible location, for example, at a network accessible location identified by identifier ID. Though identifier ID need not identify the network accessible location of image I. Once the location of image I is determined, image I is transmitted to kiosk 18 (step 120).

In step 122, recipient R can view image I on input means 30 of kiosk 18. Recipient R may also view any option(s) for image I which have been selected by user U (though user U may not have selected any options). If user U selected option(s), user U may have already provided payment for the selected option(s). The payment may have been provided by user U by means of entering his credit card number. User U may also enter a monetary limit for the transaction. For the particular example given above, user U may have paid for the 8×10 photograph. Other options which may have been selected by user U or recipient R include a single or multiple copies, stickers, cards, posters, and value-added services such as enlargements, borders, and special image effects. Further options may include other photo products such as a tee shirt, mug, calendar, puzzle, photo CD, mouse pad, book bag, album page, and cake decoration. When the output option(s) for the image bearing product has been selected by recipient R (step 122), recipient R can direct kiosk 18 to print the selected image bearing product(s) (step 124).

Figure 5A:
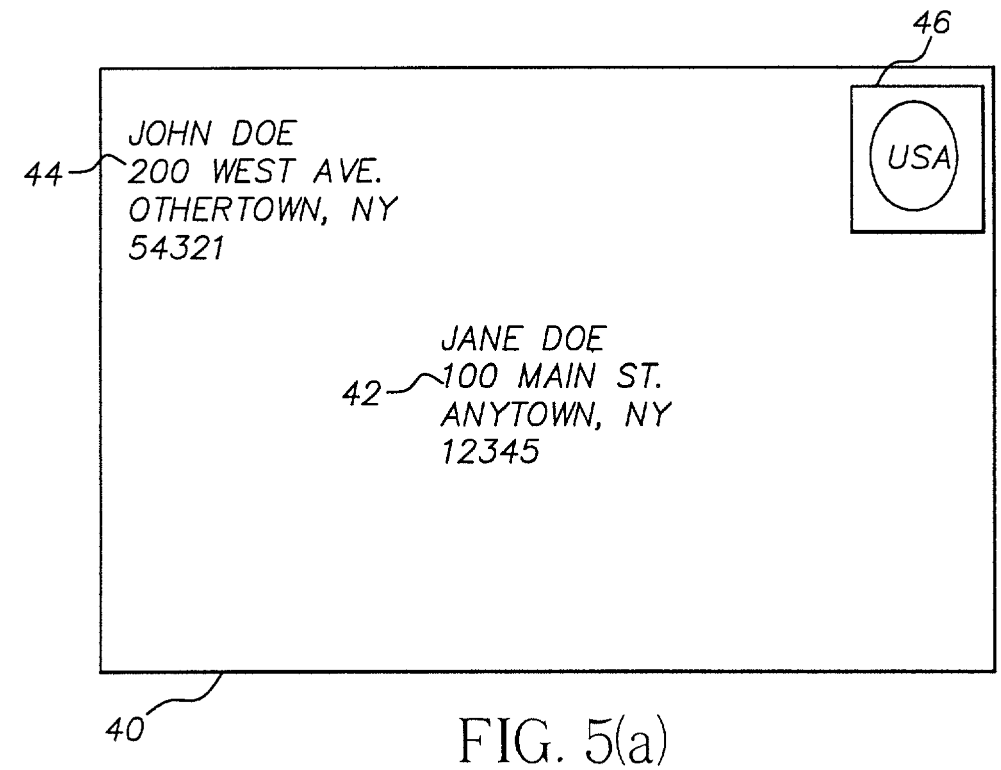
FIGS. 5(*a*) and 5(*b*) show a front and back view, respectively, of a postcard for notifying a recipient to collect an image bearing product at a kiosk.
Figure 5B:
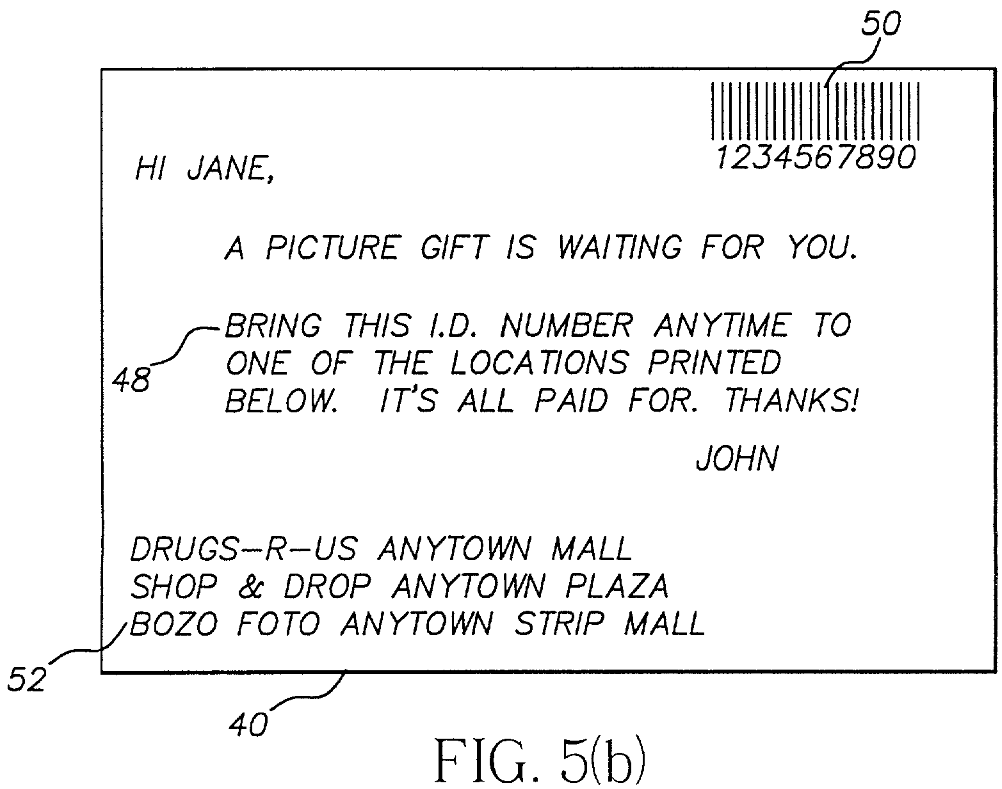

FIGS. 5(*a*) and 5(*b*) show, respectively, a front and back view of a postcard 40 which can be generated by printer 24 to be sent to recipient R (as described in step 112). The front of postcard 40 includes a recipient address area 42. The front of postcard 40 may optionally include a return address area 44, which may be user's U address or the address of a photography shop or store where kiosk 10 is located or a service which operates kiosk 10 or networked kiosks. If postcard 40 is to be mailed via the U.S. Post Office, a postage area 46 is needed on the front view for a stamp or meter marking.

The back view of postcard 40 shows a message area 48 for the inclusion of a message for recipient R. Message area 48 can, for example, provide notification of user's U creation of an image bearing product. This may be an automatic message or a message generated by user U. Postcard 40 also includes an identifier area 50 for the inclusion of identifier ID. Postcard 40 preferably includes a store location area 52, providing, for example, a listing of the names/addresses of stores having kiosks. If recipient R's image bearing product is a photo product such as a tee shirt or mug, store location area 52 could specify the specific store/location for recipient R to pick up the product. Optionally, store location area 52 may be used as an advertising area, for example for advertising specific stores, store events, store openings, store coupons, and special store promotions.

Figure 6:
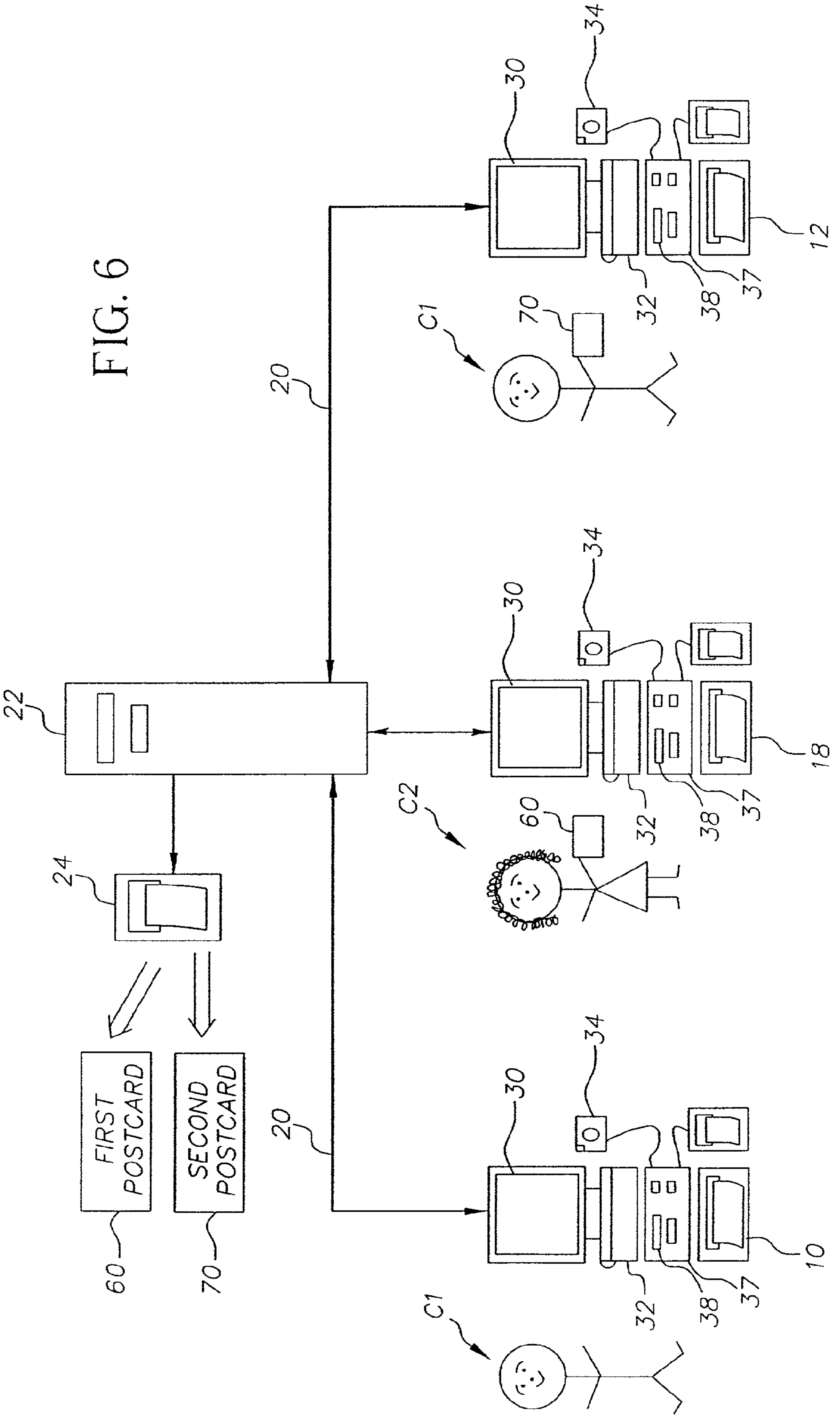
FIG. 6 shows a schematic diagram of another method for dispensing image bearing products in accordance with the present invention.
Figure 7:
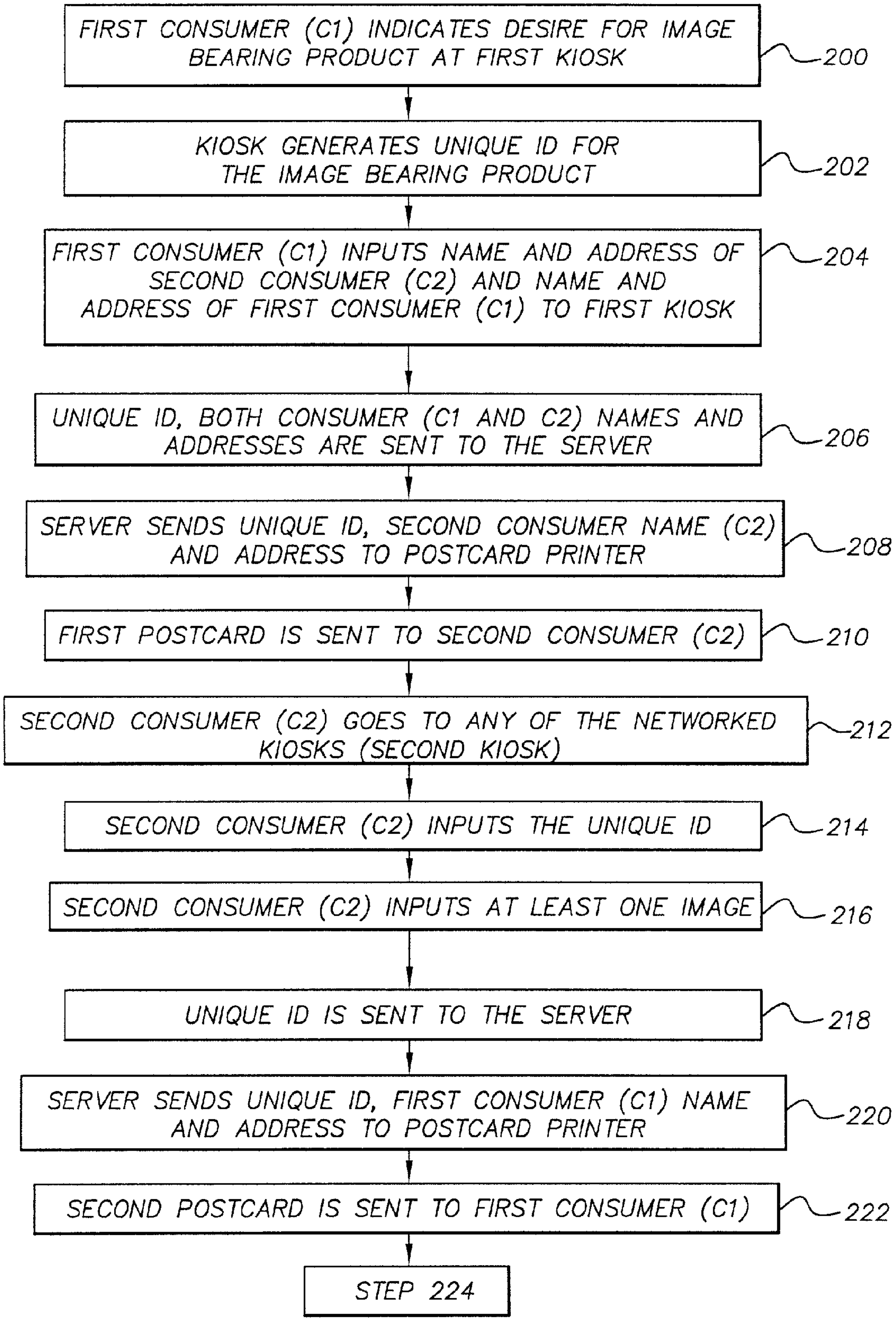
FIGS. 7 and 8 show a flow diagram of another method for dispensing image bearing products in accordance with the present invention.
Figure 8:
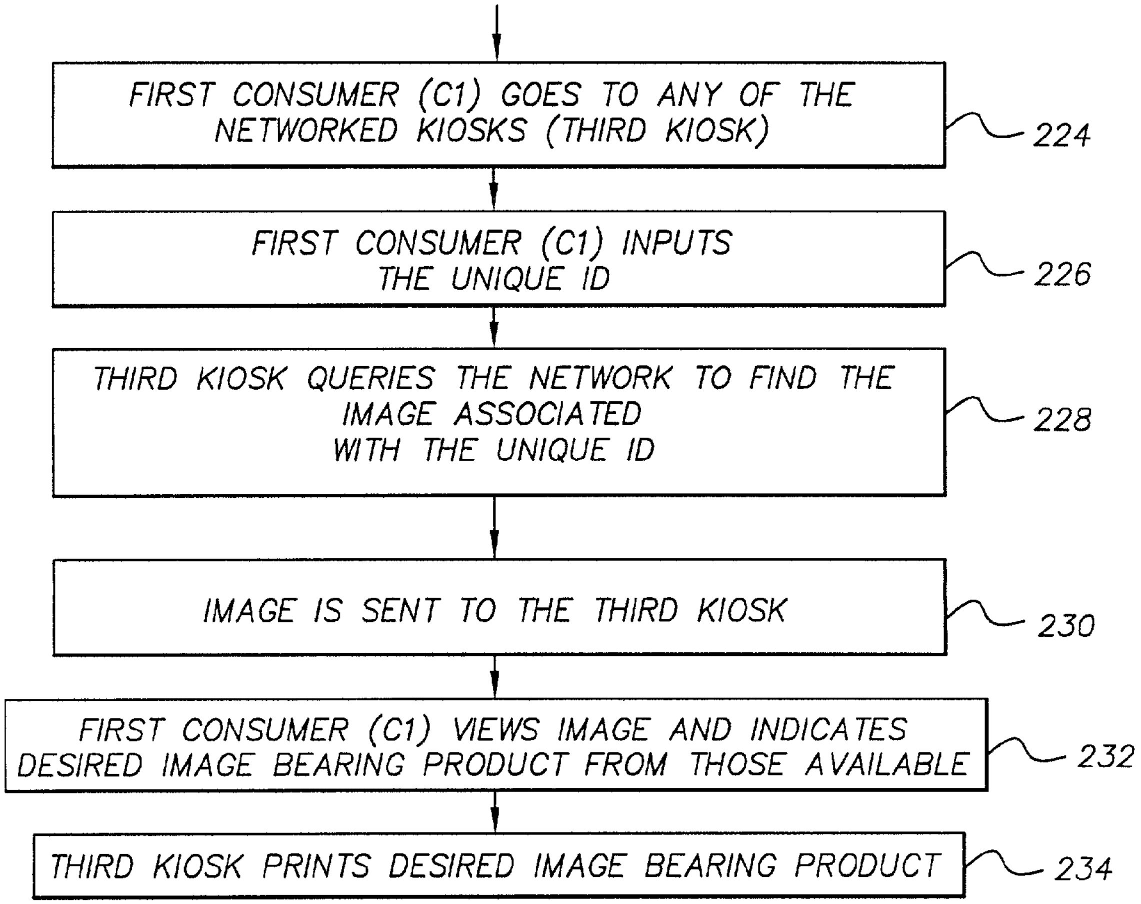

Referring now to FIGS. 6–8, FIG. 6 shows a schematic diagram illustrating another method of dispensing image bearing products in accordance with the present invention, while FIGS. 7–8 depict a flow diagram of the method.

In step 200, a first consumer C1 indicates at a first kiosk (referenced in FIG. 6 as kiosk 10, and hereinafter referred to as first kiosk 10) the desire to produce an image bearing product with image data acquired remotely. This is accomplished by interacting with input means 30. Identifier ID is generated for the image bearing product (step 202). In step 204, first consumer C1 inputs the name and address information of a second consumer C2. First consumer C1 also inputs the name and address information of first consumer C1 (step 204). In step 206, first kiosk 10 sends identifier ID and the name and address information of both first consumer C1 and second consumer C2 to server 22. Server 22 sends the information to printer 24 for printing of a first postcard 60 (step 208), and first postcard 60 is sent to second consumer C2 (step 210). First postcard 60 printed from printer 24 for this method is more particularly described below.

Continuing to refer to FIGS. 6–8, second consumer C2 takes identifier ID to a second kiosk (referenced in FIG. 6 as kiosk 18, and hereinafter referred to as second kiosk 18) which is network connected to first kiosk 10 (step 212). In step 214, second consumer C2 inputs identifier ID by means of input means 30, by scanning first postcard 60 on scanner 32, or by any means that allows second kiosk 18 to recognize identifier ID. In step 216, second kiosk 18 directs second consumer C2 to input an image I, for example, by means of scanner 32, image capture device 34, input device 37, aperture 38, or other input means of second kiosk 18. After image I has been input to second kiosk 18, second kiosk 18 sends identifier ID to server 22 (step 218). Server 22 sends this information and the previously gathered first consumer C1 address information to postcard printer 24 for printing of a second postcard 70 (step 220), which is sent to first consumer C1 (step 222). Second postcard 70 printed from printer 24 for this method is more particularly described below.

Continuing to refer to FIGS. 6–8, first consumer C1 takes identifier ID to a third kiosk (referenced in FIG. 6 as kiosk 12, and hereinafter referred to as third kiosk 12) which is any of the network connected kiosks (step 224). Note that third kiosk 12 may in fact be first kiosk 10. First consumer C1 inputs identifier ID by means of input means 30, by scanning second postcard 70 on scanner 32, or by any means that allows third kiosk 12 to recognize identifier ID (step 226). In step 228, third kiosk 12 queries the network for the location of image I corresponding to identifier ID. Image I may reside on first kiosk 10, second kiosk 18, or at some other point on the network such as server 22. Once located, image I is sent to third kiosk 12 (step 230). In step 232, first consumer C1 can view image I and the options for image I which have been selected by second consumer C2, particularly those options which have been provided by previous payment. First consumer C1 may have paid for a simple copy of the image, or for multiple copies and value-added services such as enlargements, borders, and special image effects. When the output option(s) has been selected, first consumer C1 can direct third kiosk 12 to print the image bearing product (step 234).

Figure 9A:
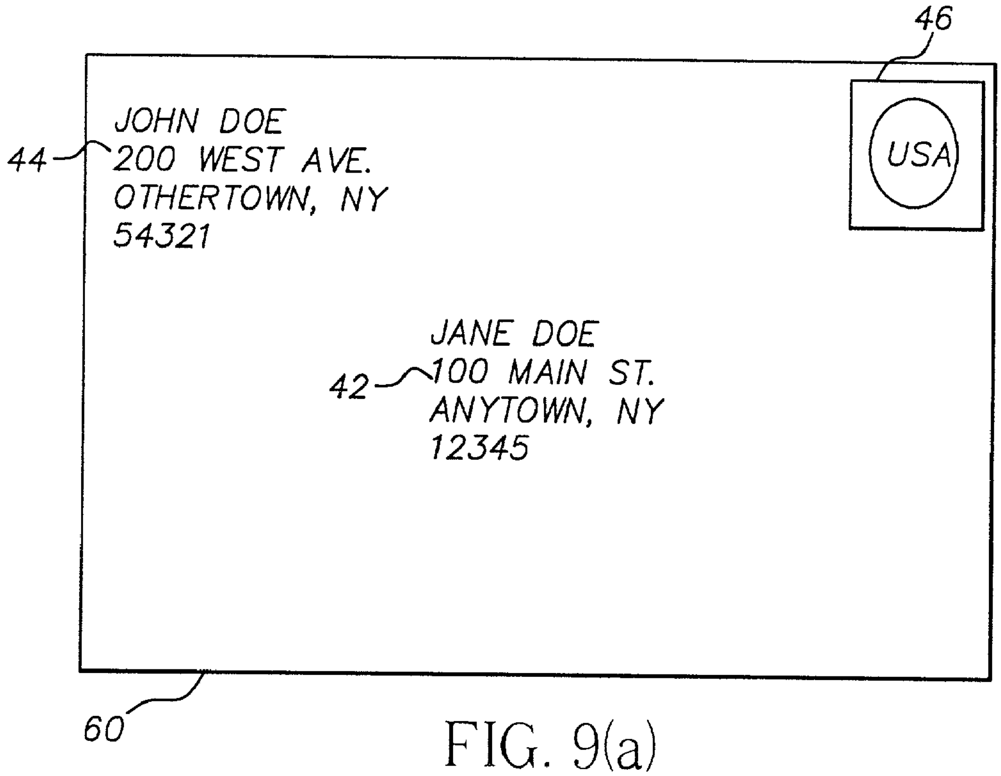
FIGS. 9(*a*) and 9(*b*) show a front and back view, respectively, of a postcard for notifying a recipient to input an image at a kiosk.
Figure 9B:
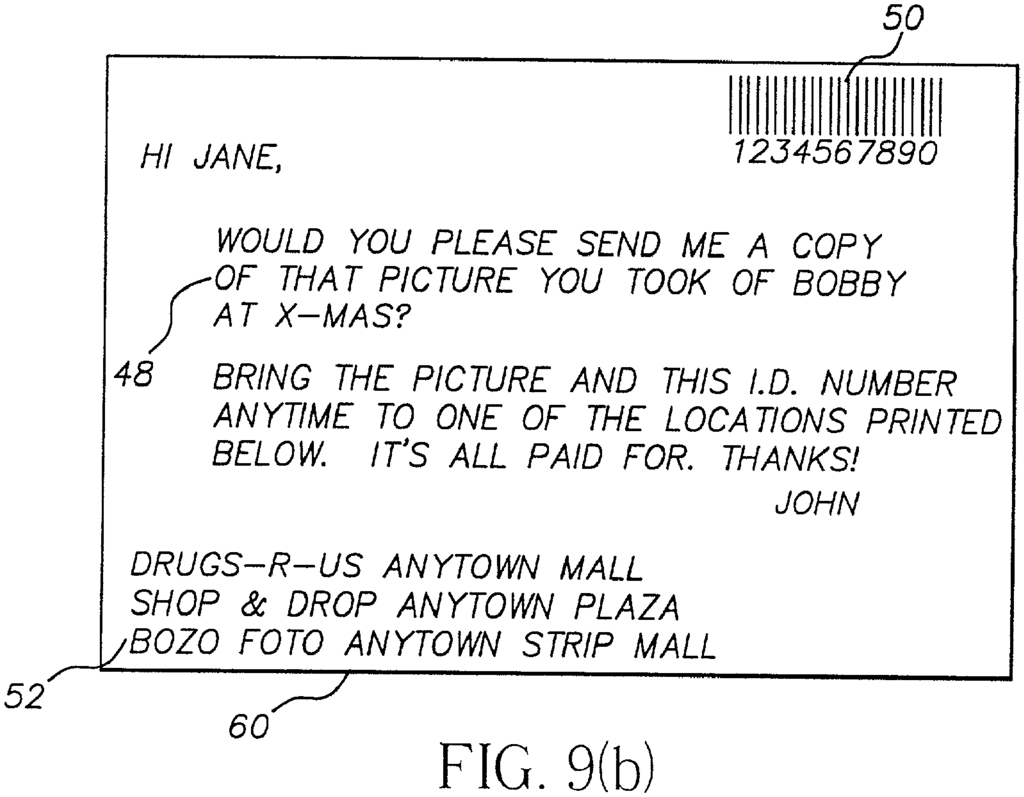

FIGS. 9(*a*) and 9(*b*) show, respectively, a front and back view of first postcard 60 generated by printer 24 to be sent to second consumer C2 (as described in step 210). As illustrated in FIG. 9(*a*), the front of first postcard 60 includes recipient address area 42, the recipient being second consumer C2. The front of first postcard 60 may optionally include return address area 44, which may be first consumer's C1 address or the address of a store where first kiosk 10 is located or a service which operates first kiosk 10, server 22, or networked kiosks. If first postcard 60 is to be mailed via the U.S. Post Office, postage area 46 may be included.

As illustrated in FIG. 9(*b*), the back view of first postcard 60 includes message area 48 for the inclusion of a message for second consumer C2. Message area 48 can, for example, provide notification of first consumer's C1 desire to create an image bearing product, and/or may include a reference or description of the image desired. This may be an automatic message or a message generated by first consumer C1. First postcard 60 further includes identifier area 50 for the inclusion of identifier ID. Store location area 52 may be provided on the back view. As discussed above, store location area 52 may include a listing of the names/addresses of stores having kiosks, specific store/locations, or be used as an advertising area.

Figure 10A:
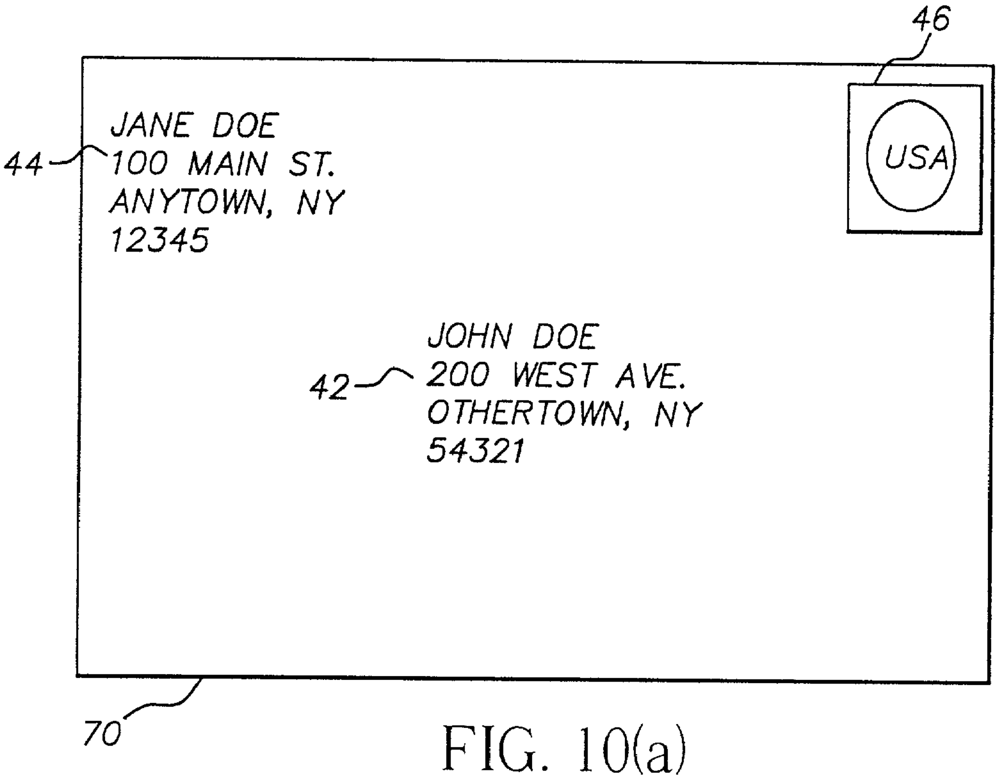
FIGS. 10(*a*) and 10(*b*) show a front and back view, respectively, of another postcard for notifying a recipient to collect an image bearing product at a kiosk.
Figure 10B:
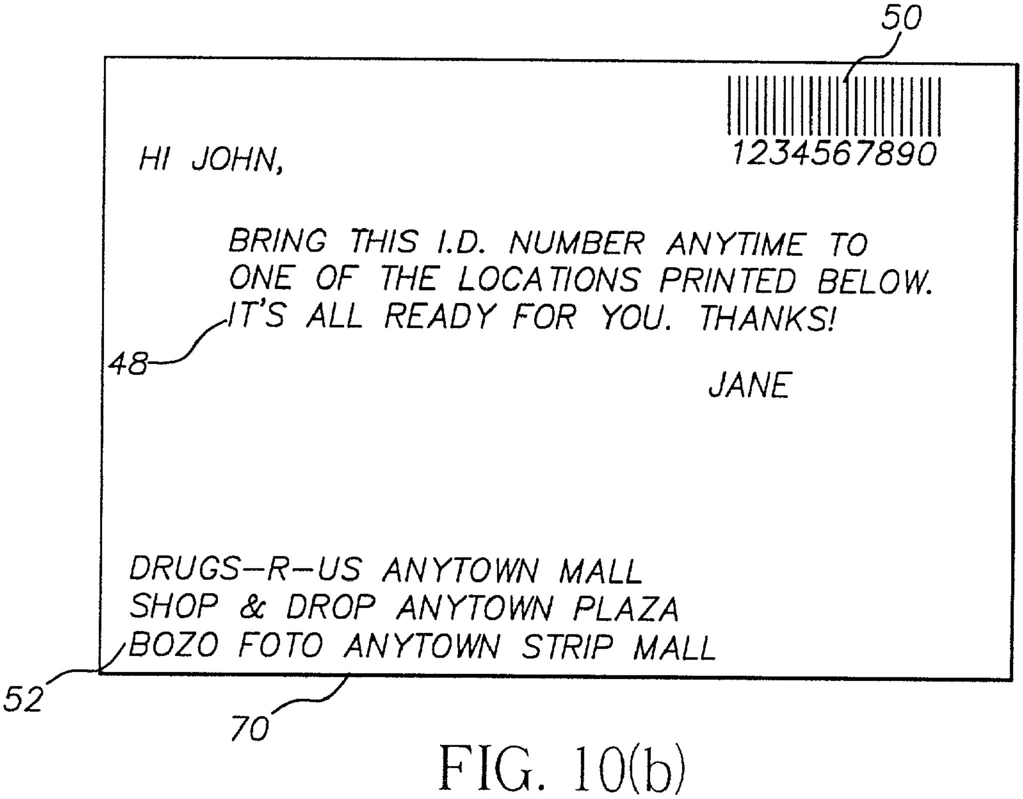

FIGS. 10(*a*) and 10(*b*) show, respectively, a front and back view of second postcard 70 generated by printer 24 to be sent to first consumer C1 (as described in step 222). The front of second postcard 70 includes recipient address area 42, the recipient being first consumer C1. The front of second postcard 70 may optionally include return address area 44, which may be second consumer's C2 address or the address of a photography store where second kiosk 18 is located or a service which operates second kiosk 18, server 22, or networked kiosks. If second postcard 70 is to be mailed via the U.S. Post Office, postage area 46 may be included.

As illustrated in FIG. 10(*b*), the back view of second postcard 70 includes message area 48 for the inclusion of a message for first consumer C1. Message area 48 can, for example, provide notification that second consumer C2 has input image I. This may be an automatic message or a message generated by second consumer C2. The back view further includes identifier area 50 for the inclusion of identifier ID. Store location area 52 may be provided on the back view. As discussed above, store location area 52 may include a listing of the names/addresses of stores having kiosks, specific store/locations, or be used as an advertising area.

Postcard 40, first postcard 60 and/or second post 70 are used for notification, and this notification may not be limited to this form. For example, email messages may be used to provide notification to the user/recipient and first and second consumer. Also, automated telephone messages may be used for notification. Wireless communication means might also be employed.

The printer which generates the postcard can be located anywhere on the network. It may be attached to server 22 as shown in FIG. 1 as printer 24, or attached at each kiosk location as shown in FIG. 2 as printer 36.

The notification may also alert the user/recipient/consumer to kiosks which are close to their addresses. The location of these kiosks can be selected from a list of networked kiosks that are geographically close. For example, the locations of these kiosks could be provided in store location area 52, as shown in FIG. 10(*b*).

Figure 11A:
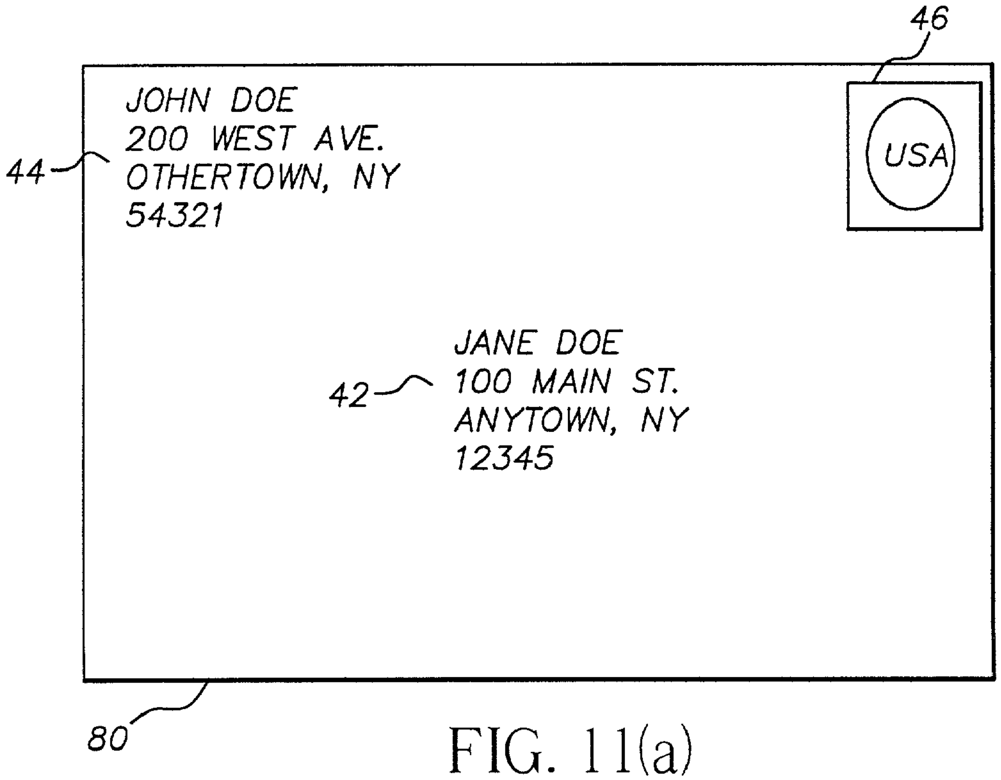
FIGS. 11(*a*) and 11(*b*) show a front and back view, respectively, of a postcard including an image for notifying a recipient to collect an image bearing product at a kiosk.
Figure 11B:
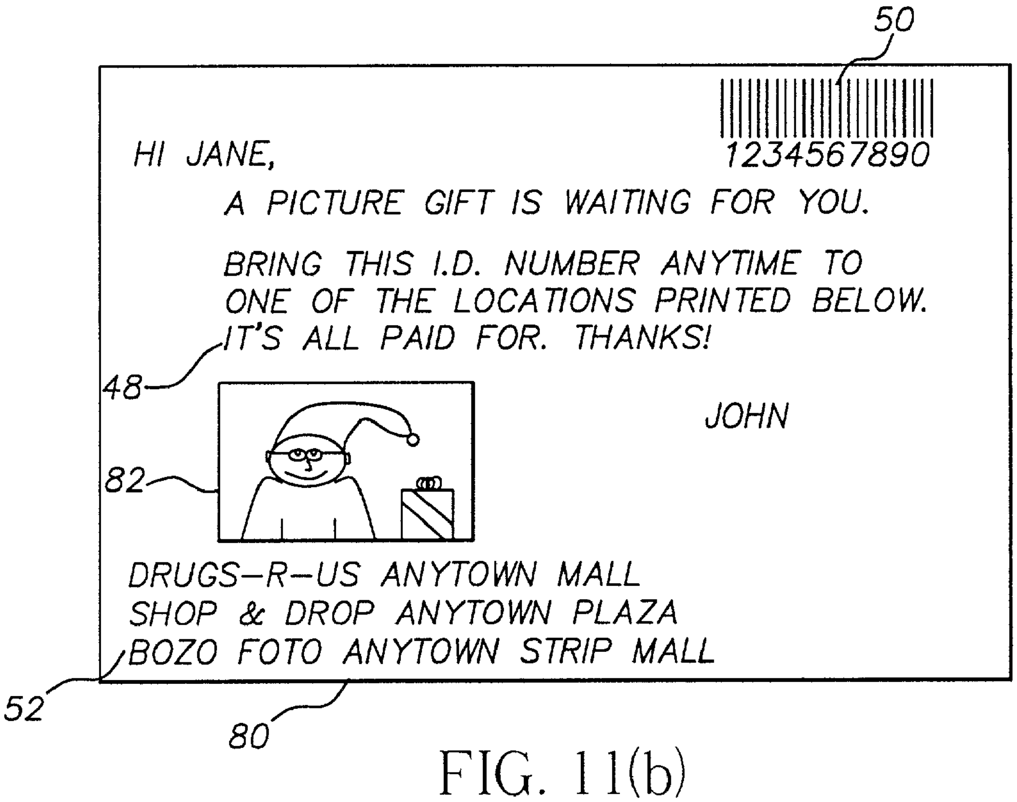

The notification can optionally include a print or file representative of the image to be used on the image bearing product. This representation can entice the recipient to go to one of the listed kiosks and receive the image bearing product. FIGS. 11(*a*) and 11(*b*) show, respectively, a front and back view of a postcard 80 having an image area 82 with a representative image.

Other means that allows the kiosk to recognize identifier ID could include, for example, a radio frequency (RF) transponder. Accordingly, the postcard would comprise an RF tag having identifier ID. Alternatively, if the postcard includes a magnetic stripe having identifier ID, the kiosk could include a magnetic head for reading the magnetic stripe. Still further, if identifier ID is a bar code, the postcard could be read by the kiosk if the kiosk included a bar code reader. Identifier ID is illustrated as a bar code on postcards 40, 60, 70, 80 as illustrated in FIGS. 5(*b*), 9(*b*), 10(*b*), and 11(*b*), respectively. In addition, a kiosk employing a print scanner and optical character reader software, hereinafter referred to as OCR software, could use eye readable alphanumeric text to recognize identifier ID.

System 5, as illustrated in FIG. 1, may be specific to a single retailer or may encompass a plurality of kiosks located at differing retailers. A large chain retailer might prefer to enable system 5 only for kiosks operating under the retailer's control.

System 5 may include means for paying for the image bearing product. For example, payment may be provided by the user by entering a credit card number to a kiosk using either a keypad or other known credit card reading device. Thus, system 5 would charge the user's credit card account. The user could limit the dollar amount that may be charged. In this manner, the recipient may choose from a number of output options that have differing prices. Optionally, payment may be provided to a store clerk (or other point of sale capability) by cash, check, or credit card, and the store clerk could acknowledge the prepayment for the image bearing product via the kiosk.

Prepayment may also carry value beyond that of the image bearing product. For example, the value of a picture frame or photo album might be prepaid. System 5 could alert the retailer that this prepayment has occurred, such as by means of a separate postcard to the retailer, a coupon printed on the recipient's notification (e.g., postcard), or by a coupon printed by the retailer's kiosk.

System 5 might also be enabled to notify the paying consumer of charges made by the recipient. For example, when the image bearing product is generated or the picture frame is obtained by the recipient, a hardcopy or electronic notification may be sent to the paying consumer.

The function of the first kiosk may also be accomplished by a first consumer at a networked home computer. The necessary indication of desire for an image bearing product and payment method may be accomplished by well known home ordering processes.

System 5 can also provide a receiving consumer (i.e., the recipient) with an opportunity to send a thank you message to the paying consumer. When the receiving consumer is collecting the image bearing product, the kiosk might query the receiving consumer, asking if the creation of a thank you note is desired. If created, the thank you note could be sent to the paying consumer by hardcopy (e.g. printed on printer 24 and sent via the U.S. Postal Service) or by electronic means. If a thank you is not generated, system 5 might optionally generate a confirmation to be sent to the paying consumer indicating that the image bearing product has been picked up by the receiving consumer.

Figure 12:
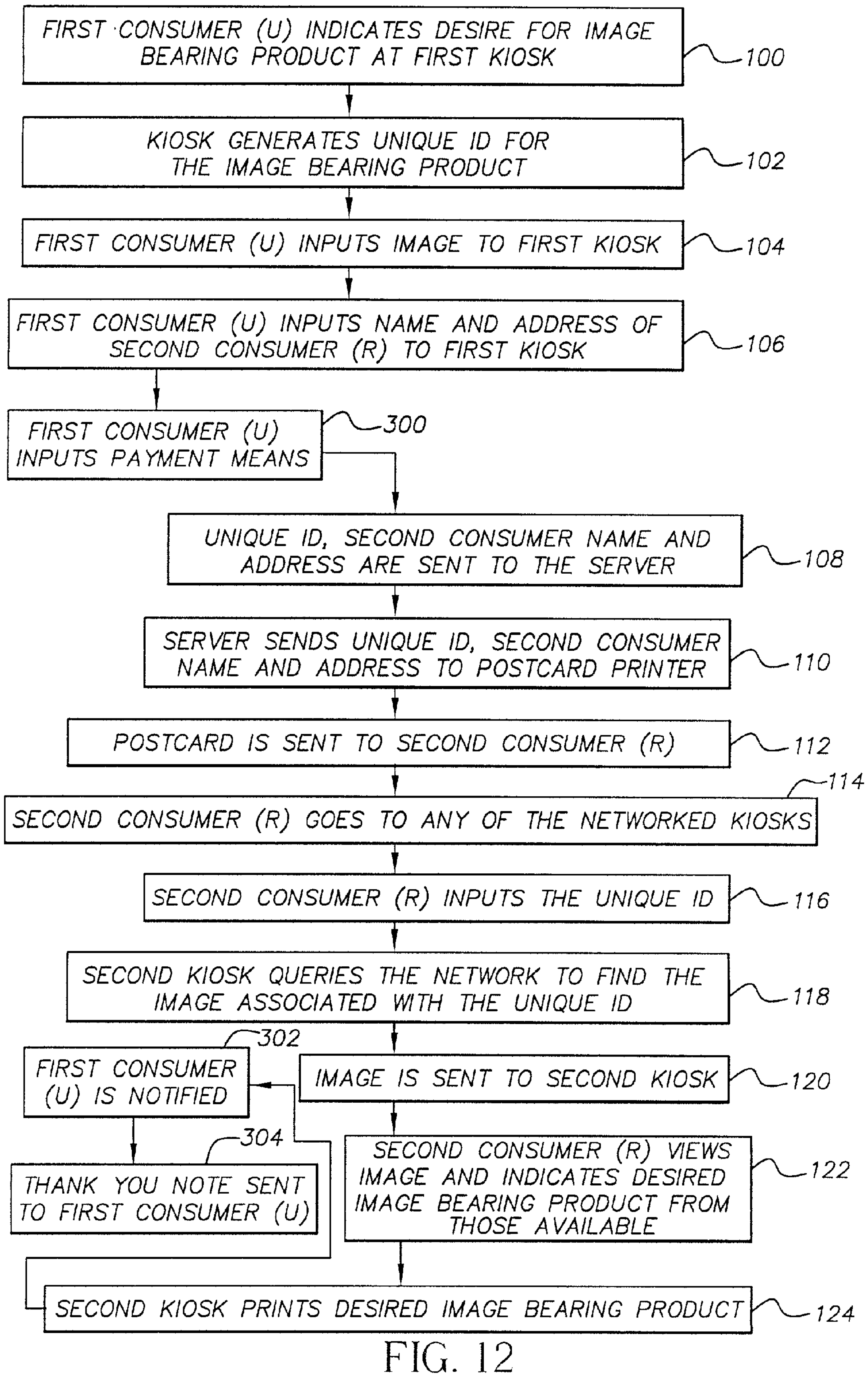
FIG. 12 shows a flow diagram of a method for purchasing an image bearing product in accordance with the present invention.
Figure 13:
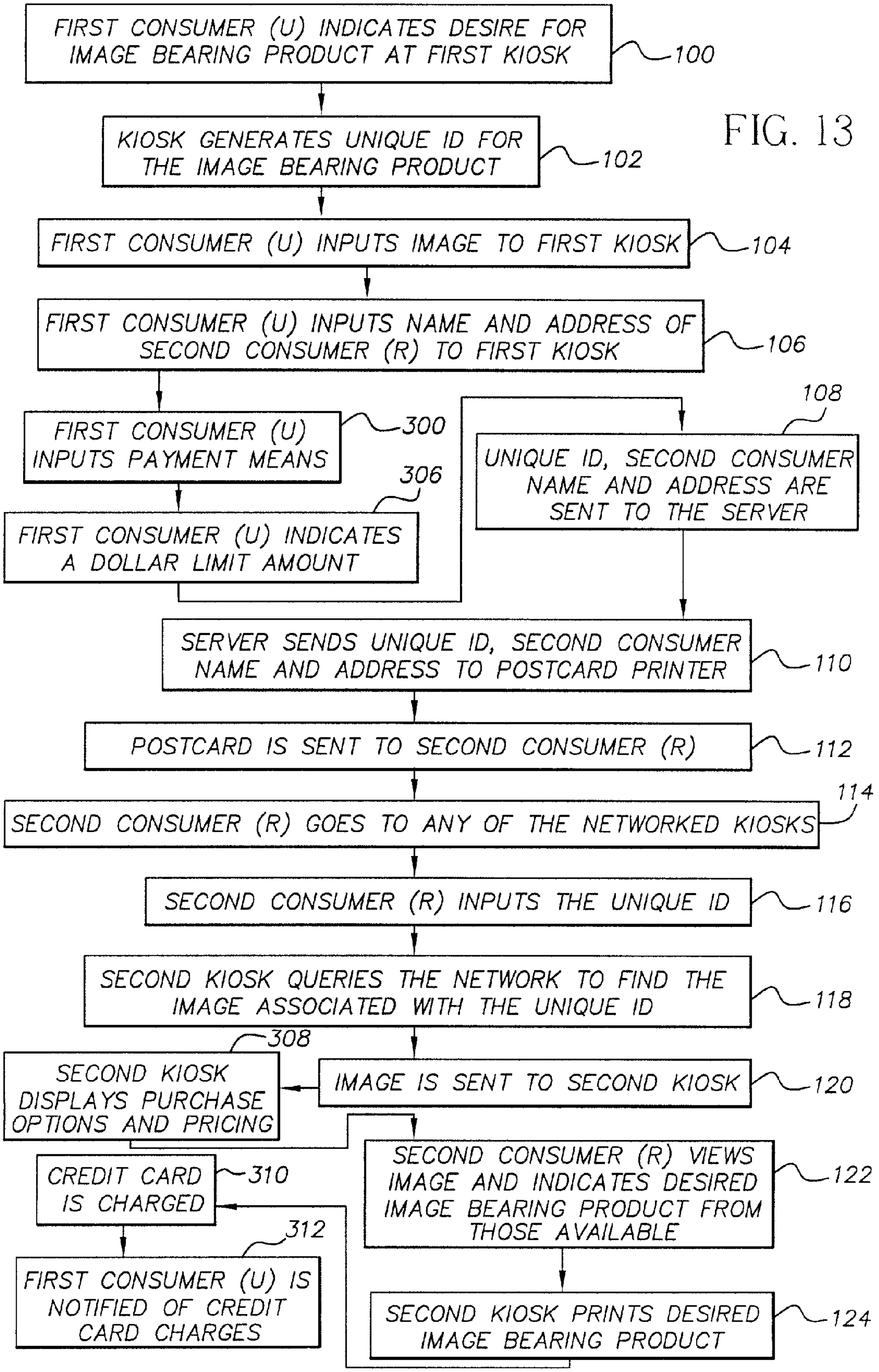
FIG. 13 shows a flow diagram of another method for purchasing an image bearing product in accordance with the present invention.

FIGS. 12 and 13 show flow diagrams for purchasing an image bearing product in accordance with the present invention. For ease of discussion, the flow diagrams shown in FIGS. 12 and 13 are discussed in relation to the schematic diagram of FIG. 3 and the flow diagram of FIG. 4.

A method of remotely ordering or purchasing an image bearing product illustrated in FIG. 12 comprises steps 100–124 discussed above. In addition, as illustrated in FIG. 12, at step 300, user U inputs payment means. As discussed above, the payment means preferably is a credit card, though other payment means can be used, such as cash and check. Then, after the image bearing product is generated (step 124), a notification is sent to user U (step 302). Such notification can indicate the charges to the credit card, the generation of the image bearing product or the obtaining of the other products by the recipient. As noted above, the notification can be a hardcopy or electronic notification. Optionally, a thank you note can be sent to user U (step 304).

Another method of remotely providing an image bearing product is illustrated in FIG. 13 and comprises steps 100–124 discussed above. In addition, at step 300, user U inputs payment means, and further inputs a dollar limit amount for the payment means (step 306). Accordingly, when recipient R queries the second kiosk, the second kiosk can display purchase options and pricing (step 308). Recipient R selects at least one of the purchase options for the image bearing product. If the pricing for the selected image bearing product is greater than the dollar limit set by user U, recipient R can provide additional payment means, such as using the recipient's credit card, for any difference. Then, after the image bearing product is generated (step 124), user U's payment means (e.g., credit card) is charged (step 310), and a notification is sent to user U (step 312). Such notification can indicate the charges to the credit card, the generation of the image bearing product or the obtaining of the other products by the recipient. As noted above, the notification can be a hardcopy or electronic notification. Optionally, a thank you note can be sent to user U (not shown in FIG. 13).

Those skilled in the art will recognize that the described purchasing method may be applied to FIGS. 6–11. For example, with regard to FIG. 8, second consumer C2 could provide a credit card number for payment of the image bearing product. Accordingly, when first consumer C1 retrieves the image and generates the image bearing product, first consumer C1 does not need to provide payment as it has been arranged by second consumer C2.

Various combinations for the purchasing method may be recognized. For example, first consumer C1 may provide both the image and payment, thereby providing a gift for second consumer C2. Second consumer C2 may provide both the image and payment, thereby providing a gift for first consumer C1. First consumer C1 may provide the payment, and second consumer may obtain an image bearing product after inputting an image. Similarly, first consumer C1 may provide payment, but first consumer C1 may obtain the image bearing product after second consumer C2 has input the image.

Further features may be employed for the transaction. For example, if the image bearing product has not been generated within a pre-determined time period, a refund of the payment may be provided. Alternatively, if only a portion of the payment is required to pay for the generated image bearing product, a partial refund (i.e., a refund of the balance of the payment) may be made. It should be recognized that once a full or partial refund is made, identifier ID may be in-activated.

It should also be recognized that more than one payment means may be provided for the method. That is, both user U and recipient R might provide credit card numbers, for example, to pay a balance due or to purchase additional image bearing products.

Another feature which may be employed is a re-notification. That is, if any one of the steps has not been completed within a predetermined time period (for example, the image has not been retrieved within a pre-determined time period or the image bearing product has not been generated within the pre-determined time period), then the recipient can be re-notified. The re-notification may be in the same form as the first notification, or could be of a different form. For example, the first notification might be by postcard, while the re-notification might be by email. More than one re-notification might be desired.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

| | |
|---|---|
| 5 | system |
| 10 | kiosk |
| 12 | kiosk |
| 14 | kiosk |
| 16 | kiosk |

-continued

PARTS LIST

| | |
|---|---|
| 18 | kiosk |
| 20 | channel |
| 22 | server |
| 24 | printer |
| 30 | input means |
| 32 | scanner |
| 34 | image capture device |
| 36 | printer |
| 37 | input device; computer |
| 38 | aperture |
| 40 | postcard |
| 42 | recipient address area |
| 44 | return address area |
| 46 | postage area |
| 48 | message area |
| 50 | identifier area |
| 52 | store location area; advertising area |
| 60 | first postcard |
| 70 | second postcard |
| 80 | postcard |
| 82 | image area |
| C1 | first consumer |
| C2 | second consumer |
| R | recipient |
| U | user |

What is claimed is:

1. A method of remotely purchasing an image bearing product, comprising the steps of:

a) providing a plurality of network connected kiosks having image input and product output capability;

b) generating an identifier;

c) inputting an image at one of the plurality of network connected kiosks;

d) storing the image at a network accessible location;

e) providing payment;

f) providing a recipient with the identifier;

g) using the identifier to retrieve the image;

h) generating the image bearing product at any one of the plurality of network connected kiosks; and i) further comprising the step of re-notifying the recipient of the identifier if the image has not been retrieved within a pre-determined time period.

2. The method of claim 1, wherein, prior to providing the recipient with the identifier, the step of providing payment comprises inputting a credit card number.

3. The method of claim 2, further comprising the step of indicating a dollar limit amount for the payment.

4. The method of claim 1, wherein, prior to providing the recipient with the identifier, the step of providing payment comprises inputting a credit card number at one of the plurality of network connected kiosks.

5. The method of claim 1, wherein one of the plurality of networked connected kiosks comprises a networked home computer, and wherein, prior to providing the recipient with the identifier, the step of providing payment comprises inputting a credit card number at the networked home computer.

6. The method of claim 1, wherein the step of providing payment comprises inputting a credit card number and a name of a credit card holder.

7. The method of claim 6, further comprising the step of, after generating the image bearing product, notifying the credit card holder of a dollar amount charged to the credit card.

8. The method of claim 1, further comprising the step of displaying, for the recipient on any one of the plurality of network connected kiosks, purchase options and pricing for the displayed purchase options.

9. The method of claim 1, further comprising the step of sending a thank you message.

10. The method of claim 1, wherein the image is retrieved at any of the plurality of network connected kiosks.

11. The method of claim 1, wherein the network accessible location is identified by the identifier, and the image is stored and retrieved from the network accessible location identified by the identifier.

12. The method of claim 1, further comprising the step of providing a refund of a portion of or all of the payment.

13. The method of claim 1, wherein the step of providing the recipient with the identifier comprises:

a) providing a network connected printer;

b) inputting a name and address of the recipient at one of the plurality of network connected kiosks;

c) printing a postcard with the network connected printer comprising the name and address of the recipient and the identifier; and d) sending the postcard to the recipient.

14. The method of claim 13, further comprising the step of reading the identifier from the postcard.

15. The method of claim 13, further comprising the step of scanning the identifier from the postcard.

16. A method of notifying a recipient of the availability of an image bearing product, comprising the steps of:

a) providing a plurality of network connected kiosks having image input capability, product output capability, and point of sale capability;

b) generating an identifier;

c) inputting an image at one of the plurality of network connected kiosks;

d) storing the image at a network accessible location;

e) providing payment for the image bearing product using the point of sale capability;

f) notifying a recipient of the identifier after payment has been provided;

g) using the identifier to retrieve the image;

h) using the retrieved image to generate the image bearing product at any one of the plurality of network connected kiosks; and i) re-notifying the recipient of the identifier if the image has not been retrieved within a pre-determined time period.

17. The method of claim 16, wherein the image is stored at a network accessible location identified by the identifier, and the image is retrieved from the network accessible location identified by the identifier.

18. The method of claim 16, further comprising the step of providing a refund of a portion of or all of the payment.

19. The method of claim 16, wherein the step of notifying comprises:

a) providing a network connected printer;

b) inputting a name and address of the recipient at one of the plurality of network connected kiosks;

c) printing a postcard with the network connected printer comprising the name and address of the recipient and the identifier; and d) sending the postcard to the recipient.

20. The method of claim 19, further comprising the step of reading the identifier from the postcard.

21. The method of claim 19, further comprising the step of scanning the identifier from the postcard.

22. The method of claim 16, further comprising the step of sending a thank you message.

23. The method of claim 16, wherein one of the plurality of networked connected kiosks comprises a networked home computer.

24. The method of claim 16, wherein the image is retrieved at any one of the plurality of network connected kiosks.

25. A method of purchasing an image bearing product, comprising the steps of:

a) providing a plurality of network connected kiosks having image input and product output capability;

b) generating an identifier;

c) providing a credit card number, a name of a credit card holder, a dollar limit amount, and an authorization to charge the credit card number up to the dollar limit amount;

d) notifying a recipient of the identifier and the authorization to charge the credit card number up to the dollar limit amount;

e) the recipient inputting an image at one of the plurality of network connected kiosks;

f) storing the image at a network accessible location;

g) using the identifier to retrieve the image;

h) generating the image bearing product at any one of the plurality of network connected kiosks; and i) re-notifying the recipient of the identifier if the recipient has not generated the image bearing product within a pre-determined time period.

26. The method of claim 25, further comprising the step of notifying the credit card holder of the dollar amount charged to the credit card.

27. The method of claim 25, further comprising the step of sending a thank you message to the credit card holder.

28. The method of claim 25, wherein the image is retrieved at any of the plurality of network connected kiosks.

29. The method of claim 25, wherein the image is stored at a network accessible location identified by the identifier, and the image is retrieved from the network accessible location identified by the identifier.

30. The method of claim 25, further comprising the step of charging the credit card for the image bearing product.

31. A method of purchasing an image bearing product, comprising the steps of:

a) providing a plurality of network connected kiosks having image input and product output capability;

b) providing a network connected printer;

c) generating an identifier;

d) printing a first postcard with the network connected printer comprising a name and address of a first recipient and the identifier;

e) sending the first postcard to the first recipient;

f) the first recipient inputting an image at one of the plurality of network connected kiosks;

g) the first recipient inputting a credit card number;

h) storing the image at a network accessible location;

i) printing a second postcard with the network connected printer comprising a name and address of a second recipient and the identifier;

j) sending the second postcard to the second recipient;

k) the second recipient using the identifier to retrieve the image;

l) using the retrieved image to generate the image bearing product at any one of the plurality of network connected kiosks; and m) charging the credit card for the generated image bearing product.

32. The method of claim 31, further comprising the step of the first recipient indicating a dollar limit amount for a payment of the image bearing product.

33. The method of claim 31, further comprising the step of notifying the first recipient of the dollar amount charged to the credit card.

34. The method of claim 31, further comprising the step of sending the first recipient a thank you message.

35. A method of remotely providing an image bearing product, comprising the steps of:

a) providing a plurality of network connected kiosks having image input and product output capability;

b) generating an identifier;

c) inputting an image at one of the plurality of network connected kiosks;

d) storing the image at a network accessible location;

e) inputting a credit card number and a name of a credit card holder;

f) indicating a dollar limit amount for the charges which can be made to the credit card;

g) providing the identifier to a recipient;

h) using the identifier to retrieve the image;

i) displaying, on any one of the plurality of network connected kiosks, purchase options;

j) selecting at least one of the plurality of purchase options as the image bearing product;

k) generating the selected purchase option from any one of the plurality of network connected kiosks;

l) charging the credit card for the selected purchase option;

m) notifying the credit card holder of the dollar amount charged to the credit card; and n) re-notifying the recipient of the identifier if the recipient has not generated the image bearing product within a pre-determined time period.

36. The method of claim 35, further comprising the step of sending a thank you message to the credit card holder.

37. The method of claim 35, wherein the one of the plurality of networked connected kiosks comprises a networked home computer.

38. The method of claim 35, further comprising the step of notifying a retailer of the selected purchase option.

39. The method of claim 38, wherein the step of notifying the retailer comprises sending the retailer a postcard.

40. The method of claim 38, wherein the step of notifying the retailer comprises sending an electronic mail message.

41. The method of claim 38, further comprising the step of sending a coupon to the recipient.

42. A method of purchasing an image bearing product, comprising the steps of:

a) providing a plurality of network connected kiosks having image input and product output capability;

b) generating an identifier;

c) providing a credit card number, a name of a credit card holder, a dollar limit amount, and an authorization to charge the credit card number up to the dollar limit amount;

d) notifying a recipient of the identifier and the authorization to charge the credit card number up to the dollar limit amount;

e) the recipient inputting an image at one of the plurality of network connected kiosks;

f) storing the image at a network accessible location;

g) notifying the credit card holder of the identifier and the input of the image by the recipient;

h) using the identifier to retrieve the image;

i) generating the image bearing product at any one of the plurality of network connected kiosks; and j) re-notifying the recipient of the identifier if the recipient has not generated the image bearing product within a pre-determined time period.

43. The method of claim 42, further comprising the steps of:

the recipient providing a credit card number, and an authorization to charge the recipient's credit card number; and charging the recipient's credit card number for the image bearing product.

* * * * *